(12) United States Patent
Van Wieringen et al.

(10) Patent No.: US 10,568,458 B2
(45) Date of Patent: Feb. 25, 2020

(54) HEATING DEVICE AND METHOD FOR HEATING FOOD IN A CONTAINER, IN PARTICULAR MILK IN A BABY BOTTLE

(71) Applicant: KONINKLIJKE PHILIPS N.V., Eindhoven (NL)

(72) Inventors: Arjan Teodor Van Wieringen, Eindhoven (NL); Jingqi Hou, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 115 days.

(21) Appl. No.: 15/551,115

(22) PCT Filed: Mar. 3, 2016

(86) PCT No.: PCT/EP2016/054484
§ 371 (c)(1),
(2) Date: Aug. 15, 2017

(87) PCT Pub. No.: WO2016/146390
PCT Pub. Date: Sep. 22, 2016

(65) Prior Publication Data
US 2018/0020871 A1    Jan. 25, 2018

(30) Foreign Application Priority Data

Mar. 13, 2015  (EP) .................................... 15159092

(51) Int. Cl.
*A47J 36/24* (2006.01)
(52) U.S. Cl.
CPC ....... *A47J 36/2438* (2013.01); *A47J 36/2483* (2013.01); *A47J 36/24* (2013.01)

(58) Field of Classification Search
CPC .... A47J 36/24; A47J 36/2438; A47J 36/2483; G01K 7/42
See application file for complete search history.

(56) References Cited

U.S. PATENT DOCUMENTS 5,773,795 A   6/1998  Messmer
6,417,498 B1  7/2002  Shields
(Continued)

FOREIGN PATENT DOCUMENTS

FR    2810493 A1 * 12/2001 ......... G05D 23/1951
GB    2516610 A    2/2015
(Continued)

*Primary Examiner* — Joseph M Pelham (57) ABSTRACT

The present invention relates to a heating device (10) for heating food (12) in a container (14), in particular milk in a baby bottle, comprising a chamber (16) configured to contain a fluid (18) and to receive the container (14), a heating unit (20) for heating the fluid (18) in the chamber (16), a temperature measuring element (22) for measuring a temperature of the fluid (18) over a time range, a calculation unit (24) for determining, for each time point of the time range being a first time point, a temperature difference of the fluid (18) between the first time point and a corresponding second time point of the time range different from the first time point, the calculation unit (24) being configured to compare the determined temperature difference to a predefined amount of temperature, and an estimation unit (26) for estimating an arrival time point, at which a pre-set temperature for the food (12) contained in the container (14) is reached, based on the comparison result of the calculation unit (24).

18 Claims, 8 Drawing Sheets

(56) References Cited

U.S. PATENT DOCUMENTS

| | | |
|---|---|---|
| 8,061,308 B2 | 11/2011 | Phillips |
| 2003/0219061 A1* | 11/2003 | Seeger .................. G01K 1/045 |
| | | 374/152 |
| 2003/0222075 A1 | 12/2003 | Binet |
| 2004/0149729 A1* | 8/2004 | Kressmann ....... A47J 27/21083 |
| | | 219/494 |
| 2007/0215599 A1 | 9/2007 | Kahler |
| 2008/0031302 A1* | 2/2008 | Rund ....................... G01K 7/42 |
| | | 374/102 |
| 2008/0056328 A1* | 3/2008 | Rund ....................... G01K 3/00 |
| | | 374/102 |
| 2008/0121636 A1* | 5/2008 | Hallgren ............. H05B 6/6435 |
| | | 219/708 |
| 2008/0199164 A1* | 8/2008 | Wortley ............. A47J 36/2438 |
| | | 392/444 |
| 2009/0116535 A1* | 5/2009 | Rund ....................... G01K 7/42 |
| | | 374/102 |
| 2012/0061376 A1 | 3/2012 | Mcbean |
| 2017/0086620 A1* | 3/2017 | Duineveld .......... A47J 36/2438 |

FOREIGN PATENT DOCUMENTS

| | | |
|---|---|---|
| JP | 2005304845 A | 11/2005 |
| WO | 2007022507 A2 | 2/2007 |
| WO | 2013084161 A1 | 6/2013 |

* cited by examiner

HEATING DEVICE AND METHOD FOR HEATING FOOD IN A CONTAINER, IN PARTICULAR MILK IN A BABY BOTTLE

This application is the U.S. National Phase application under 35 U.S.C. § 371 of International Application No. PCT/EP2016/054484, filed on Mar. 3, 2016, which claims the benefit of International Application No. 15159092.4 filed on Mar. 13, 2015. These applications are hereby incorporated by reference herein.

FIELD OF THE INVENTION

The present invention relates to a heating device for heating food in a container, in particular milk in a baby bottle, and for estimating an arrival time of a pre-set food temperature. The present invention relates particularly to a bottle warmer for warming milk in a baby bottle. Further, the present invention relates to a method for heating food in a container and for estimating an arrival time of a pre-set food temperature.

BACKGROUND OF THE INVENTION

Heating up food, in particular milk, to an acceptable temperature is an essential part of the nutrition cycle for infants. This can either be breast milk that is stored in the fridge or formula milk that is prepared from tap water or cooled down boiled water. An acceptable temperature for the milk is for most infants between 30 and 40-42° C. and more preferably between 35 and 39° C. Research shows that if the milk temperature is over 40° C. for more than 20 minutes, then the essential nutrition parts such as proteins and vitamins will be damaged.

There are several different methods of heating-up milk or food. These can be microwave heating, steam heating and water bath heating (also known as au bain-marie heating). Microwave heating method has the disadvantage that heating is not uniform in the milk and locally the milk can become very hot, causing nutrition damage. With steam heating steam is condensing on the bottle wall. It has however a disadvantage that the milk temperature inside the milk can be non-homogeneous, also resulting in parts (at the top of the bottle) of the milk that can become too hot. This is also noticed by consumers.

The au bain-marie principle is heating of milk by placing the milk in a container, in particular a baby bottle, in liquid, in particular water, which is heated via a heating element at the bottom of a chamber. This is the most common technology being used in many heating devices. One of the essential advantages of an au bain-marie system is that the heating of the milk occurs relatively uniform, i.e. there is only a small temperature gradient in the milk.

Currently, the user has to roughly define by trial and error the heating time of the baby bottle in the chamber in order to achieve the desired milk temperature. When the baby bottle is not taken out in the right time interval the milk will continue to heat up. As there is a tremendous variation in baby bottle types, sizes, milk and water volume, baby bottle wall thickness and initial milk and water temperature it is not possible for a manufacturer to give accurate advice in the manual on how long the baby bottle should be heated to achieve the required temperature.

An essential problem for a bottle warmer is that the milk temperature inside the bottle is not known. It appears rather difficult to measure the milk temperature directly in the bottle. There are bottles with temperature indicators, however these are relatively inaccurate. Further it is very difficult to read these temperature indicators when the milk is in the bottle warmer. Bottle warmers known in the past employ complex algorithms to estimate the milk temperature, wherein the algorithms are not able to be implemented in a simple micro-controller of average bottle warmers. Additionally, not all the assumptions are held in the real use case scenarios due to the uncontrolled parameters and noises.

U.S. Pat. No. 6,417,498 B1 discloses a receptacle-type heating device for automatically warming and vibrating a multitude of containers simultaneously in order to thaw, warm, and mix cold or frozen liquid. The device heats each container to a desired temperature using heat exchange of heated water with the container. A heater of the device comprises a thermostat device to set the device to a desired stable temperature.

WO2007/022507A2 discloses a method and an apparatus capable of determining the amount of time remaining before a food being heated reaches a desired temperature and/or a food reaches approximately room temperature by directly measuring the temperature of the food. Determining the amount of time remaining is based at least on the rate of temperature change of the food during heating/cooling.

SUMMARY OF THE INVENTION

It is an object of the present invention to provide a heating device for heating food in a container, in particular milk in a baby bottle, and for estimating an arrival time of a pre-set food temperature, which enables the user to know when the food reaches the predefined temperature without directly measuring the temperature of the food. It is a further object to provide a corresponding method for heating food in a container and for estimating an arrival time of a pre-set food temperature.

In a first aspect of the present invention a heating device for heating food in a container, in particular milk in a baby bottle, and for estimating an arrival time of a pre-set food temperature, is presented comprising a chamber configured to contain a fluid and to receive the container, a heating unit for heating the fluid in the chamber, a temperature measuring element for measuring a temperature of the fluid at a first time point and a second time point, a temperature measuring element for measuring a temperature of the fluid over a time range, a calculation unit for determining, for each time point of the time range being a first time point, a temperature difference of the fluid between the first time point and a corresponding second time point of the time range different from the first time point, the calculation unit being configured to compare the determined temperature difference to a predefined amount of temperature (i.e., a predefined temperature difference), wherein the calculation unit is configured to compare the determined temperature difference in a time period, in which the heating unit is in a deactivated state, and an estimation unit for estimating an arrival time point, at which a preset temperature for the food contained in the container is reached, based on the comparison result of the calculation unit.

In a second aspect of the present invention a method for heating food in a container, in particular milk in a baby bottle, and for estimating an arrival time of a pre-set food temperature, the heating device comprising a chamber configured to contain a fluid and to receive the container, is presented comprising heating the fluid in the chamber by a heating unit, measuring a temperature of the fluid at a first time point and a second time point, determining, for each time point of the time range being a first time point, a temperature difference of the fluid between the first time point and a corresponding second time point of the time range different from the first time point, comparing the determined temperature difference to a predefined amount of temperature (i.e., a predefined temperature difference), wherein comparing the determined temperature difference is carried out in a time period, in which the heating unit is in a deactivated state, and estimating an arrival time point, at which a pre-set temperature for the food contained in the container is reached, based on the comparison result of the calculation unit.

In yet further aspects of the present invention, there are provided a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, processor, computer program and medium have similar and/or identical preferred embodiments as the claimed device and as defined in the dependent claims.

Using the chamber to contain the fluid, the heat generated by the heating unit can be transferred to the food contained in the container, so that the food can be heated to a certain temperature, in particular a temperature suitable for infants. By means of the temperature measuring element, the present invention enables to determine the temperature of the food without directly contacting the food, thereby avoiding contamination of the food, so that increased hygiene is realized. It is understood that the temperature measuring element may directly measure the temperature of the fluid, or indirectly via the temperature of the chamber.

Further, while providing the possibility of heating the food to a pre-set temperature, the heating device according to the present invention additionally enables the user to estimate the arrival time point, at which the pre-set temperature for the food is reached. In particular, the present invention utilizes knowledge from thermal physics that when no heat is input into a thermal system, its temperature will reach a steady value characterizing a thermal equilibrium between different parts of the thermal system. In the case of the heating device, when a pre-set temperature for the food is reached, the heater is configured so that it does not generate heat to further increase the temperature of the food, or generate only a certain amount of heat in order to maintain the pre-set temperature. Therefore, the temperature of the fluid will be close to the pre-set temperature of the food.

Therefore, by measuring the temperature of the fluid at two different time points, one can determine the temperature difference between the two time points. This difference is compared to a predefined temperature amount (i.e., a predefined temperature difference). Based on the comparison, the arrival time point, at which the pre-set temperature for the food contained in the container is reached can be estimated with high accuracy and reliability. Advantageously, the present invention enables to consume the food as soon as its pre-set temperature is reached, thereby avoiding degradation of the food due to delay of usage.

The calculation unit is configured to compare the determined temperature difference in a time period, in which the heating unit is in a deactivated state. When the heating unit is in a deactivated state, the heating device is in a cooling phase, an overshoot phase or in an interval between two short heating periods, in particular heating boosts, of a heating phase, in particular of the thermostat heating phase. Preferably, the different cooling and/or heating phases are taken into account, so that the estimation of the arrival time point is more accurate.

The main advantages of this algorithm is to be able to detect when the food/milk is ready, wherein the detection is done at the arrival time point of the pre-set food temperature. Preferably, the heating device is able to communicate to the user via video/audio signals about the knowledge that the food/milk is ready. It is not able to estimate the arrival time point prior to the arrival time point. In other words, by monitoring the temperature behavior detected by the temperature measuring element, the heating device judges if the milk is ready or not, wherein it preferably provides a 'ready' signal to the user. In this way, the user does not need to worry about if the milk is ready or overheated.

In a preferable embodiment, the calculation unit is configured to register an intermediate time point being the later one from the first and the second time point when at the first time point the calculated temperature difference or its absolute value is less than or equal to the predefined amount of temperature (i.e., the predefined temperature difference). In this way, the arrival time point can be estimated based on determining a state of the fluid and the container, in particular a state of the fluid and the food, the so-determined state being close to or at a thermal equilibrium. Advantageously, the arrival time point can be estimated with high accuracy.

Preferably, the estimation unit is configured to estimate the arrival time point being the second time point. In this way, the arrival time point can be estimated based on the onset of the determined state close to or at thermal equilibrium. Advantageously, the arrival time point is estimated with increased accuracy.

In another preferable embodiment, the intermediate time point is registered after the absolute value of the determined temperature difference has reached a maximum. This increases advantageously the reliability of the estimation result.

Preferably, the estimation unit is configured to estimate the arrival time point being a first end time point at the end of a first predefined time period starting at the intermediate time point, if the heating unit is in a deactivated state at the intermediate time point and remains in the deactivated state over the first predefined time period. For heating up a small amount of food from a relatively high initial temperature, only a relatively small amount of heating energy is needed. This means that in this case, the food can be heated up to the pre-set temperature even in a cooling phase of the heating device, in which the heating unit is deactivated, before any thermostat boost. Advantageously, the arrival time point is estimated with further increased accuracy for the cooling phase of the heating unit.

Preferably, the estimation unit is configured to estimate the arrival time point based on detection of an activated state of the heating unit within a first predefined time period starting at the intermediate time point. Detection of the activated state of the heating unit means that the heating device is in a heating phase, in particular a thermostat heating phase. Such a heating phase is often required when a relatively large amount of heating energy is needed in order to heat up a large amount of food from a relative low initial temperature. In particular, more energy from the thermostat heating is needed for further heating up the food to its pre-set temperature. Advantageously, the arrival time point is estimated with high reliability by taking the heating phase, in particular the thermostat heating phase of the heating device into account.

Preferably, the estimation unit is configured to estimate the arrival time point based on detection of a heating period of the heating unit ending at a second end time point, the second end time point being temporaly later than the detection of the activated state of the heating unit. In this way, the heating phase, preferably a thermostat heating phase of the heating device, is taken into account with higher accuracy. Advantageously, the arrival time point is estimated with increased reliability. The heating period may, without limiting the present invention, include the time of detection of the activated state within the first predefined time period. Alternatively, the heating period may begin at a later time point after detection of the activated state within the first predefined time period.

Preferably, the estimation unit is configured to estimate the arrival time point based on detection of a state of the heating unit over a second predefined time period starting at the second end time point. In this way, the heating or cooling phase of the heating device can be detected so that the estimation of the arrival time point can be made based on the detected state. Advantageously, the arrival time point can be estimated more realiably.

Preferably, the estimation unit is configured to estimate the arrival time point being a third end time point at the end of the second predefined time period if the heating unit is in a deactivated state over the second predefined time period. The arrival time point is thus estimated to be the third end time point when the time duration between the second end time point of the detected heating period and the beginning of a subsequent heating period is longer than the second predefined time period. A relatively large time duration between two subsequent heating periods or heating boosts, in particular two thermostat heating periods, indicates that the heating power is not input for further heating up the food, but mainly for compensating the energy loss over time. By monitoring the time duration, in particular the time duration between two successive thermostat heating periods, the present invention advantageously enables to estimate the arrival time with further increased accuracy.

In a preferable embodiment, the time difference between the first and the second time point is less than 5 minutes, preferably less than or equal to 1 minute. In this way, the temperature difference of the fluid between the first and the second time point provides a reliable basis for estimating the arrival time point. In particular, a too long time difference between the first and the second time point is avoided, so that impacts of artifacts on the result of estimated arrival time point are advantageously minimized.

In another preferable embodiment, the predefined amount of temperature (i.e., the predefined temperature difference) is non-negative and less than 5° C., preferably less than or equal to 1° C. When the temperature of the food is close to the pre-set temperature, the temperature change of the fluid slows down. A predefined temperature amount that is chosen to be too large will therefore be always larger than the temperature difference between the first and the second time point. This is advantageously prevented by properly choosing the predefined temperature amount, so that the estimation of arrival time point is more reliable.

In yet a further preferable embodiment, the temperature measuring element is in direct contact with the fluid in the chamber. In this way, the temperature of the fluid is measured with increased accuracy, while no direct contact to the food is required. Advantageously, the arrival time point can be estimated with even higher reliability.

In yet a further preferable embodiment, the heating device further comprises an indicator unit for generating one or more audio and/or visual indicator signals upon estimation of the arrival time point. In this way, the user can be signaled at, preferably prior to, the arrival time point. The signal generates feedback to the user to indicate the heating stages and ultimately inform the user when the pre-set temperature is reached. To achieve this, the signal should have different displays, e.g. different audio tones, different LED flashing patterns. These different signal displays correspond to different heating stages. Therefore, the user can know via the displayed signal when the stage just prior to the arrival stage is reached and knowing upfront the heating process is almost ready. Advantageously, the present invention enables to proactively inform the user about the arrival time point.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
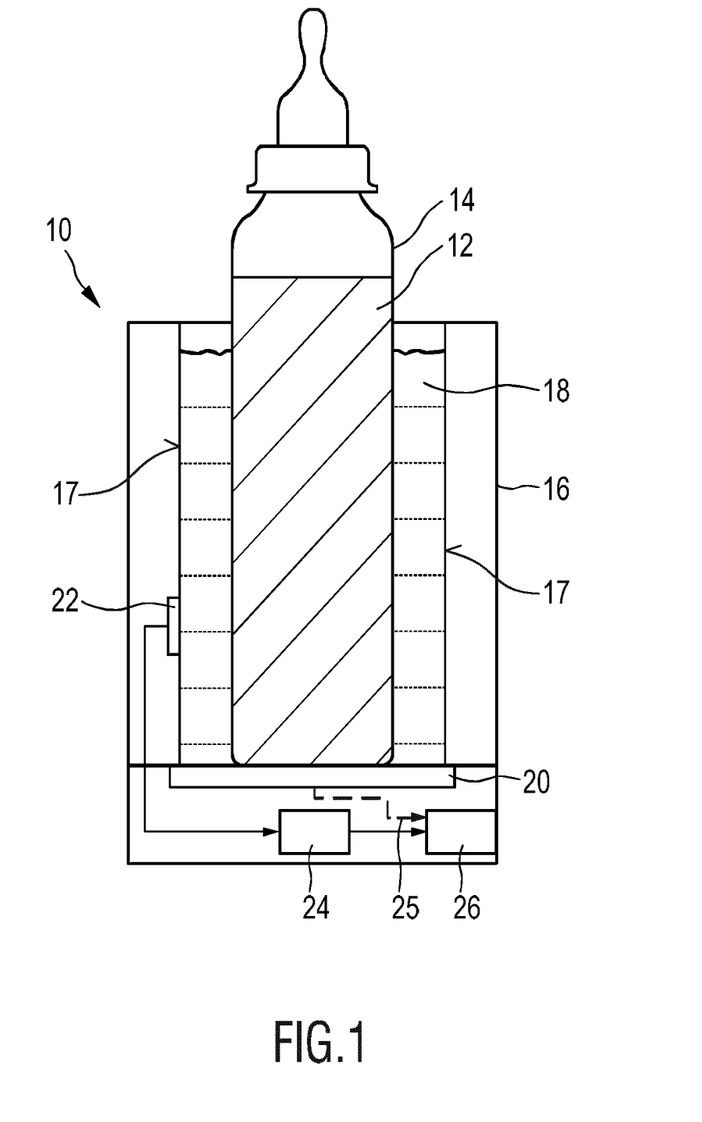
FIG. 1 shows a schematic representation of a first embodiment of the heating device according to the present invention.

FIG. 1 shows a schematic representation of a first embodiment of the heating device 10 for heating food 12 in a container 14, in particular for heating milk in a baby bottle. The heating device 10 comprises a chamber 16 for containing a fluid 18 and for receiving the container 14. The heating device 10 further comprises a heating unit 20 for heating the fluid 18 contained in the chamber 16. The heating device 10 further comprises a temperature measuring element 22 for measuring a temperature of the fluid 18 over time. Further, the heating device 10 comprises a calculation unit 24 for determining a temperature difference of the fluid 18 between a first and a second time point and for comparing the calculated temperature difference to a predefined amount of temperature (i.e., a predefined temperature difference). In addition, the heating device 10 comprises an estimation unit 26 for estimating an arrival time point, at which a pre-set temperature for the food 12 contained in the container 14 is reached, based on the comparison result of the calculation unit 24.

The container 14 can be made from different materials such as plastic, glass or heat sensitive material. The food 12 contained in the container 14 may be liquid such as water, milk or juices or baby food. The chamber 16 is preferably made from a material with low heat conductivity, so that heat exchange between the fluid 18 and the surrounding outside of the chamber 16 is effectively reduced. The fluid 18 contained in the chamber 16 is preferably water, which has a relatively high heat capacity. However, other liquids with low viscosity and even gas can be used. For instance, a gas can be filled into a space within a double wall chamber, wherein the gas is sealed.

The temperature measuring element 22 is preferably an NTC (negative temperature coefficient) or a PTC (positive temperature coefficient) temperature measuring element or a Peltier-element. Further preferably, temperature measuring elements may be a thermal coupling element. The heating unit 20 may be a heating element such as a heating coil, heating plate, thermostat and/or heating rod. In FIG. 1, the heating unit 20 is arranged at a bottom of the chamber 16. This is, however, not limiting for the present invention and other arrangements including at a wall 17 of the chamber 16 may also be employed. The heating unit 20 is controlled by a controller, for instance a processor, which is preferably embedded into the heating unit 20. Preferably, the heating unit 20 is configured to enable a thermostat heating cycle that is time-actuated and/or temperature-actuated, in particular time-actuated but not temperature-actuated. A time-actuated heating cycle means that the heating unit starts a heating cycle based on time criteria, e.g. a predefined time duration after the heater is turned off. A temperature-actuated heating cycle means that the heating unit starts a heating cycle based on temperature criteria, e.g. when the temperature drops to a predefined temperature level.

The temperature measuring element 22 is arranged at the wall 17 of the chamber 16, so that the temperature measuring element 22 is configured to measure the temperature of the fluid 18 indirectly via the temperature the chamber 16.

The calculation unit 24 is configured to register the measurement result from the temperature measuring element 22 and determines the temperature difference of the fluid 18 between a first and a second time point. Further, the calculation unit 24 is configured to compare the so-determined temperature difference to the predefined amount of temperature (i.e., the predefined temperature difference). Preferably, the calculation unit 24 compares the absolute value of the temperature difference with a non-negative predefined amount of temperature (i.e., a non-negative predefined temperature difference). Further preferably, the predefined temperature difference can be set by the user, e.g. via one or more bottoms or via audio or digital input.

The estimation unit 26 is in communication with the calculation unit 24, so that the comparison result provided from the calculation unit 24 is processed by the estimation unit 26 in order to estimate the arrival time point for the food 12. Preferably, the estimation unit 26 is configured to estimate the arrival time point for the food 12 further based on detection of a state of the heating unit 20, in particular an activated state or a deactivated state of the heating unit 20. The detection of the state of the heating unit 20 is schematically indicated by dashed arrow 25. When the heating unit 20 is in the activated state, the heating device 10 is operated in a heating phase, in which heating power is input into the heating unit 20 to heat up the chamber 16 and the fluid 18. When the heating unit 20 is in the deactivated state, the heating device 10 is operated in a cooling phase, in which no heating power is input into the heating unit 20.

Figure 2:
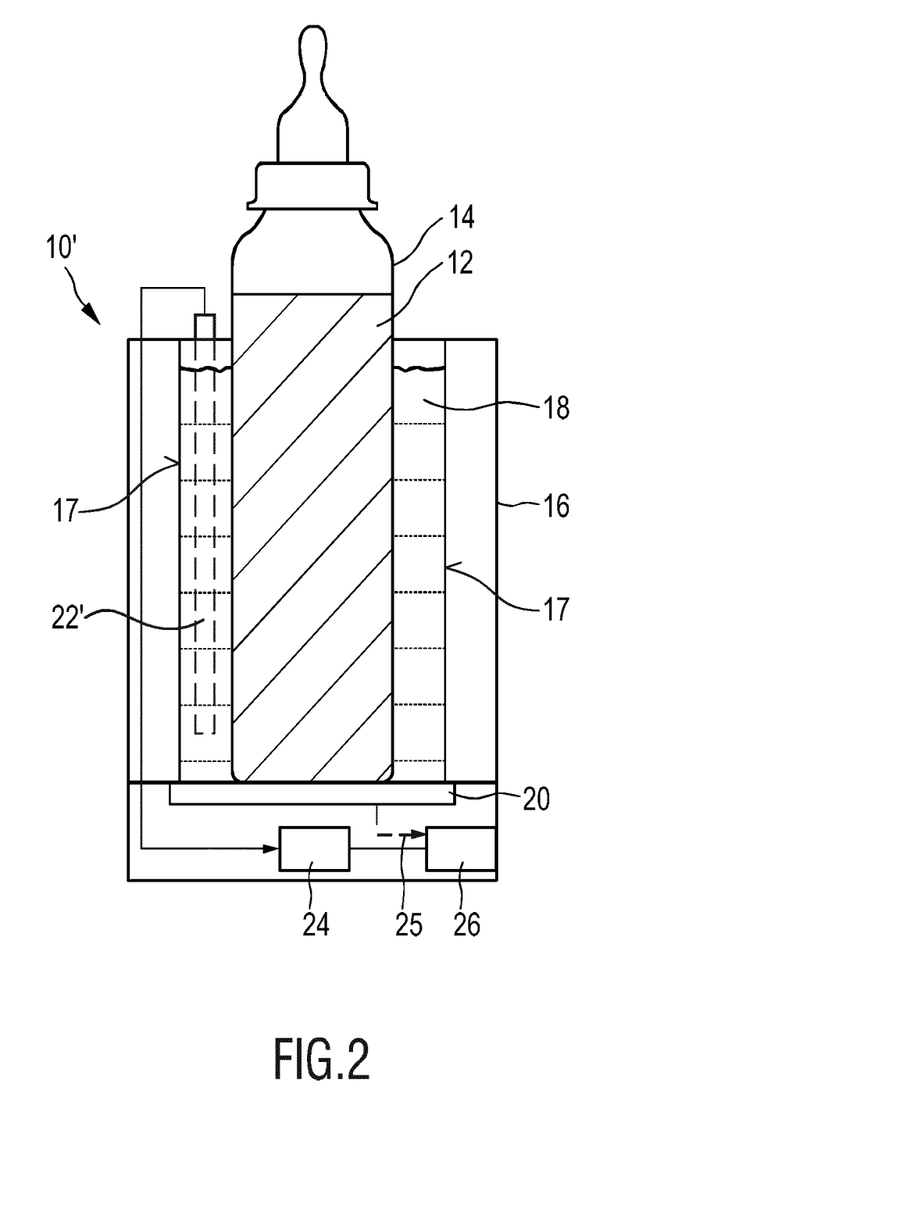
FIG. 2 shows a schematic representation of a second embodiment of the heating device according to the present invention.

FIG. 2 shows a schematic representation of a second embodiment of the heating device 10'. The heating device 10' comprises essentially the same elements as the heating device 10, so in FIG. 1, except that the temperature measuring element 22' is arranged so that it is in direct contact with the fluid 18 contained in a chamber 16. Preferably, the temperature measuring element 22' comprises an elongated portion which is vertically immersed into the fluid 18.

The working principle of the heating device 10, 10' according to the present invention is based on the insight that when the temperature of the fluid 18, preferably water, and the food 12, preferably milk, is reaching equilibrium, the change, in particular the decrease of the water temperature will slow down. By investigating the water temperature gradient during the cooling phase of the heating device 10, 10', in which the water cools down, the information about whether the milk is ready meaning that it has reached its preset temperature can be estimated.

In the following, the functionality of the heating device 10, 10' according to the present invention is explained with exemplary diagrams shown in FIGS. 3 to 8.

Figure 3:
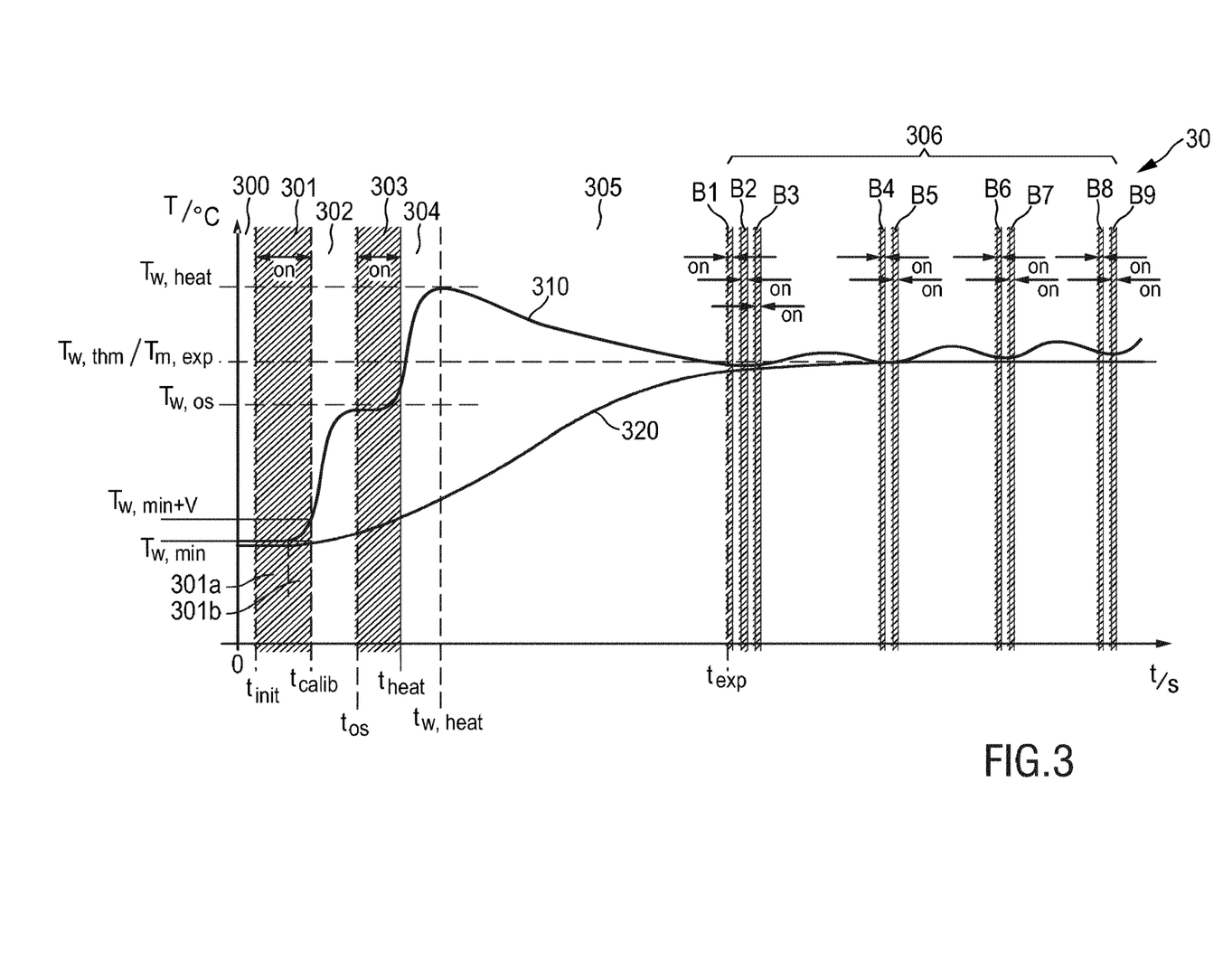
FIG. 3 shows a diagram of a temperature profile over time according to the present invention.

FIG. 3 shows a diagram of a temperature profile 30, representing the temperature T (in ° C.) over time t (in seconds), as obtained and used according to the present invention. The diagram shows two curves 310, 320. The first curve 310 represents the (measured) fluid temperature over time, and the second curve 320 represents the estimated food temperature over time.

The heating unit 20 according to the present invention is controlled mainly based on thermal knowledge. In order to cope with a large variety of scenarios appearing in practice, the heating unit 20 is preferably controlled by applying a piecewise heating function having different heating and/or cooling phases, which will be explained piece by piece in the following. The main phases include one or more of an initial phase 300, a calibration heating phase 301 (also called first heating phase), a first overshoot phase 302, a second heating phase 303, a second overshoot phase 304, a cooling phase 305, and a thermostat heating phase 306.

During the initial phase 300 lasting from t=0 to t=$t_{init}$, the heating unit 20 is in a deactivated state, in which no heating power is input to the heating unit 20. The fluid temperature is at its lowest level $T_{w,min}$, during the initial phase 300. The food temperature is also at its lowest level which is close to the $T_{w,min}$. After the initial phase 300, the heating unit 20 is first heated up over a waiting time 301a which is a first portion of the calibration heating phase 301. During the calibration heating phase 301, the heating unit 20 is in an activated state indicated by the double sited arrow and "on" in FIG. 3, so that heating power is input to the heating unit 20 and provided to the chamber 16. After the waiting time, the water temperature increases almost linearly during a second portion 301b of the calibration heating phase 301, so that at the end of the calibration heating phase 301 (t=$t_{calib}$), the fluid temperature reaches $T_{w,min+v}$. During the second portion 301b of the calibration heating phase 301, the food temperature starts to increase as well.

During the first overshoot phase 302, the heating unit 20 is operated in the deactivated state again. However, as shown in FIG. 3, the fluid temperature continues to increase during the first overshoot phase 302 and reaches $T_{w,os}$ at the end of the first overshoot phase 302 (t=$t_{os}$). Towards the end of the first overshoot phase 302, the increase of the fluid temperature slows down. During the second heating phase 303, the heating unit 20 is operated in the activated state again. The fluid temperature first remains essentially constant at the beginning of the second heating phase 303 and increases rapidly later on. The increase of the fluid temperature continues even after the end of the second heating phase 303 (t=$t_{heat}$).

During the second overshoot phase 304, the heating unit 20 is operated in the deactivated state again. However, as shown in FIG. 3, the fluid temperature continues to increase and reaches $T_{w,heat}$ at the end of the second overshoot phase 304 (t=$t_{w,heat}$), where the fluid temperature reaches its maximum value. As shown in FIG. 3, the food temperature increases steadily during the first overshoot phase 302, the second heating phase 303 and the second overshoot phase 304. As can be seen also from FIG. 3, the increase of the fluid temperature between t=0 and t=$t_{w,heat}$ is larger than the increase of the food temperature in a same time period.

In the cooling phase 305, the heating device 20 is operated in the deactivated state again, so that no heating power is input to the heating unit 20. As can be seen from FIG. 3, the fluid temperature decreases continuously during the cooling phase 305. However, since the fluid temperature is higher than the food temperature at the beginning of the cooling phase 305, heat is transferred from the fluid 18 via the container 14 to the food 12 so that the food temperature increases gradually in the cooling phase 305.

The thermostat heating phase 306 consists of a plurality of heating boosts B1-B9 (e.g. each with a duration of 1 second). The thermostat heating phase 306, which starts at t=$t_{exp}$ and ends when the user switches off or unplugs the heating device 10, 10', is configured to reach and maintain an equilibrium between the fluid temperature and the food temperature. The heating boost B1 is applied when the fluid temperature is below $T_{w,thm}$, which corresponds to the pre-set temperature of the food 12, $T_{m,exp}$. If the fluid temperature still does not increase after the first heating boost B1, one or more further heating boosts B2, B3 are applied by turning the heating unit 20 on until the fluid temperature is above or exactly at $T_{w,thm}$. When the fluid temperature decreases again, one or more heating boost groups each consisting of one or more heating boosts B4-B5, B6-B7 and B8-B9 may be applied. In this way, the food temperature can be kept substantially constant as desired or predefined temperature for some time without any risk of overheating the food.

Figure 6:
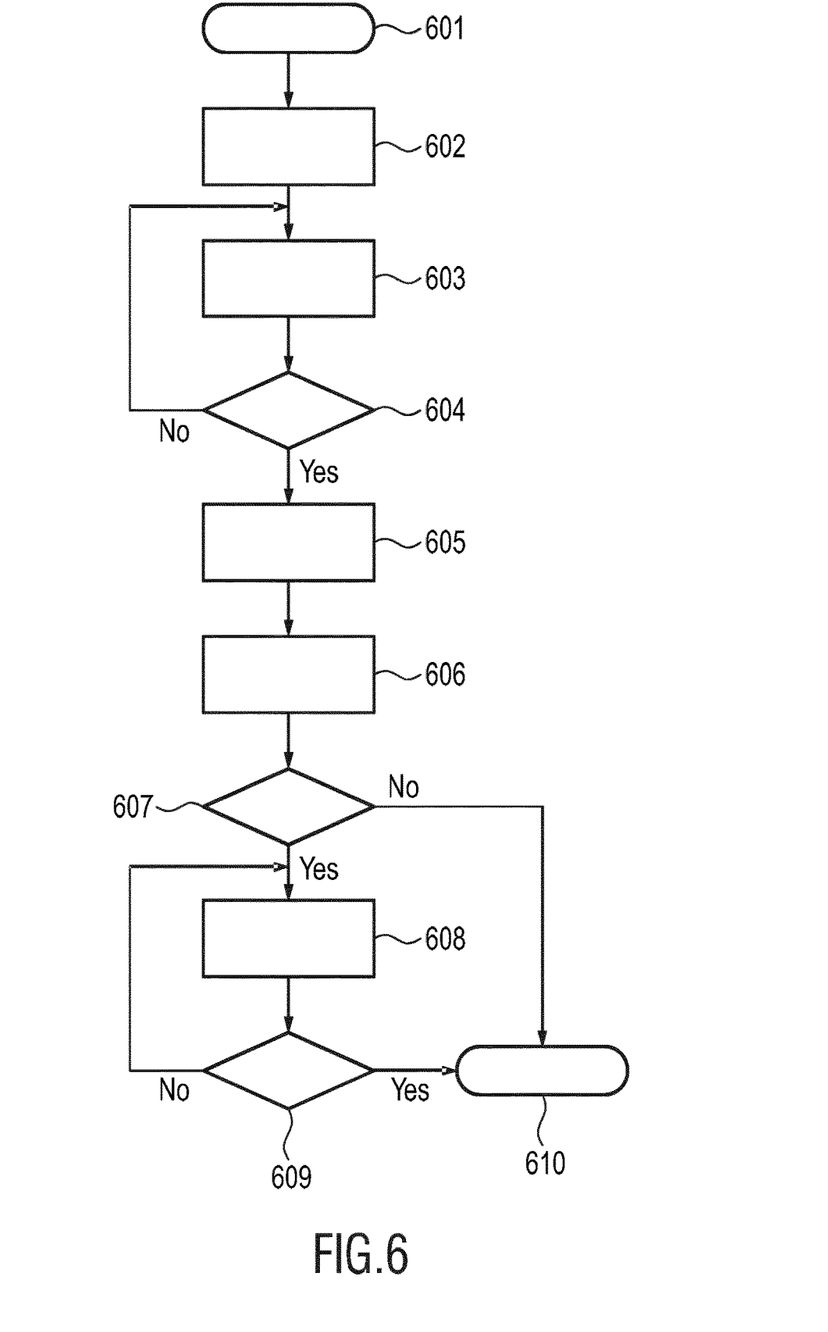
FIG. 6 shows a schematic representation of an embodiment of the method according to the present invention.

The method associated with the heating procedure shown in FIG. 3 is not only applicable to devices with high computational power, but also for devices with limited computational power. In the latter devices, very accurate float calculation with several digits is usually not possible. In order to perform a reliable estimation of arrival time point without the need of calculating the instant gradient of the water temperature profile requiring high computation capacity, a temperature difference of the fluid 18 is computed between each monitored time point being a first time point and a corresponding second time point which is different from the associated first time point. The estimation method is schematically shown in FIG. 6. Preferably, the second time point is chosen to be earlier than the first time point by a fixed amount of time being less than five minutes, more preferably less than or equal to one minute.

When the food 12 is heated up to the pre-set food temperature, no further temperature increase of the food 12 should occur. In this case, the fluid temperature will not be significantly higher than the pre-set food temperature. In other words, the thermal system consisting of the fluid 18 and the container 14, in particular consisting of the fluid 18 and the food 12, equilibrates at the pre-set food temperature, in particular the pre-set milk temperature. If the equilibrated stage is reached, there should be no significant temperature difference of the fluid 18 within a relatively short time period. The time-dependent temperature difference of the fluid 18, in particular water, $\Delta T_w$, within a time period $\Delta t_0$ can be expressed as $$\Delta T_w(t)=T_w(t)-T_w(t-\Delta t_0) \qquad (1)$$

where t is the first time point of the monitored time range in the unit of seconds and $T_w(t)$ is the fluid temperature measured in the unit of degree Celsius over time. The value of $\Delta T_w(t)$ will be calculated using an estimated time of arrival (ETA) function as soon as the fluid starts to cool down, in particular at the beginning of the cooling phase of the heating device 10, 10'.

The ETA function is activated in step 601 shown in FIG. 6. Then, the state of the heating unit 20 is detected in step 602 of FIG. 6. Once the heating unit 20 is detected to be deactivated in the cooling phase 305 of the heating device 10, 10', the ETA function is applied by the calculation unit 24 to determine $\Delta T_w(t)$ according to equation (1) in step 603 of FIG. 6, wherein the calculation unit 24 compares $\Delta T_w(t)$ to a predefined temperature amount (i.e., a predefined temperature difference), which is preferably non-negative and less than 5° C., more preferably less than or equal to 1° C. (step 604 in FIG. 6). While the fluid 18 is cooling down, the temperature gradient of the fluid 18 should be negative. Since the temperature difference is computed over a time range of preferably one minute ($\Delta t_0$=60 [s]), $\Delta T_w(t)$ may be positive at the beginning but will decrease rapidly to negative values. Preferably, the calculation unit 24 determines whether $-1[°C.]<\Delta T_w(t)<0[°C.]$ applies in step 604. The absolute value of $\Delta T_w(t)$, i.e. $|\Delta T_w(t)|$ first increases and then decreases, which means the fluid temperature drops fast at the beginning and then more slowly.

As long as step 604 provides negative result, step 603 is repeated. Otherwise, the estimation unit 26 registers an intermediate time point t=t* being the first time point, at which the calculated $\Delta T_w(t^*)$, more preferably its absolute value $|\Delta T_w(t^*)|$, is less than or equal to the predefined temperature amount, e.g. 1° C.:$|\Delta T_w(t^*)|\leq 1$ [° C.]. In this case, the fluid temperature has dropped by less than or essentially 1° C. between the first and the second time point, in particular in the past one minute. It is considered that the equilibrium state is about to be reached and the food 12 is almost ready for consumption. Preferably, an indicator unit (not shown) can be provided for generating one or more audial and/or visual indicator signals upon estimation of the arrival time point in step 605 of FIG. 6. For instance, the visual text "milk almost ready" can be shown on a display at a predefined time point prior to the estimated arrival time point. Alternatively, one or more beep tones may be generated so that the user is informed when the arrival time point is about to be reached.

In another embodiment, the estimation unit 26 is configured to estimate the arrival time point being the intermediate time point t=t*.

For some cases, the heating energy provided for heating up the food 12 during the calibrating heating phase and the second heating phase is sufficient for the food 12 to be heated up to the pre-set temperature. Such cases are referred to herein as first class of cases. For other cases, further heating energy from the thermostat heating phase is still needed for the food to finally be heated up to the expected temperature. Such cases are referred to herein as second class of cases. For the first class of cases, the ETA function is calculated by investigating the gradient of fluid temperature. For the second class of cases, since the fluid temperature would be relatively stable during the thermostat heating phase, merely investigating the gradient of the fluid temperature is not sufficient. In addition, the time interval between subsequent heating boosts may also be considered to estimate the arrival time point.

In a preferable embodiment, the estimation unit 26 is configured to estimate the arrival time point based on detection of a state of the heating unit 20 after the registered intermediate time point t=t*. This will be explained hereinafter under reference of FIG. 4 and FIG. 5. Further, the method applied by the heating device 10, 10' to perform the arrival time estimation is explained under reference of FIG. 6.

Figure 4:
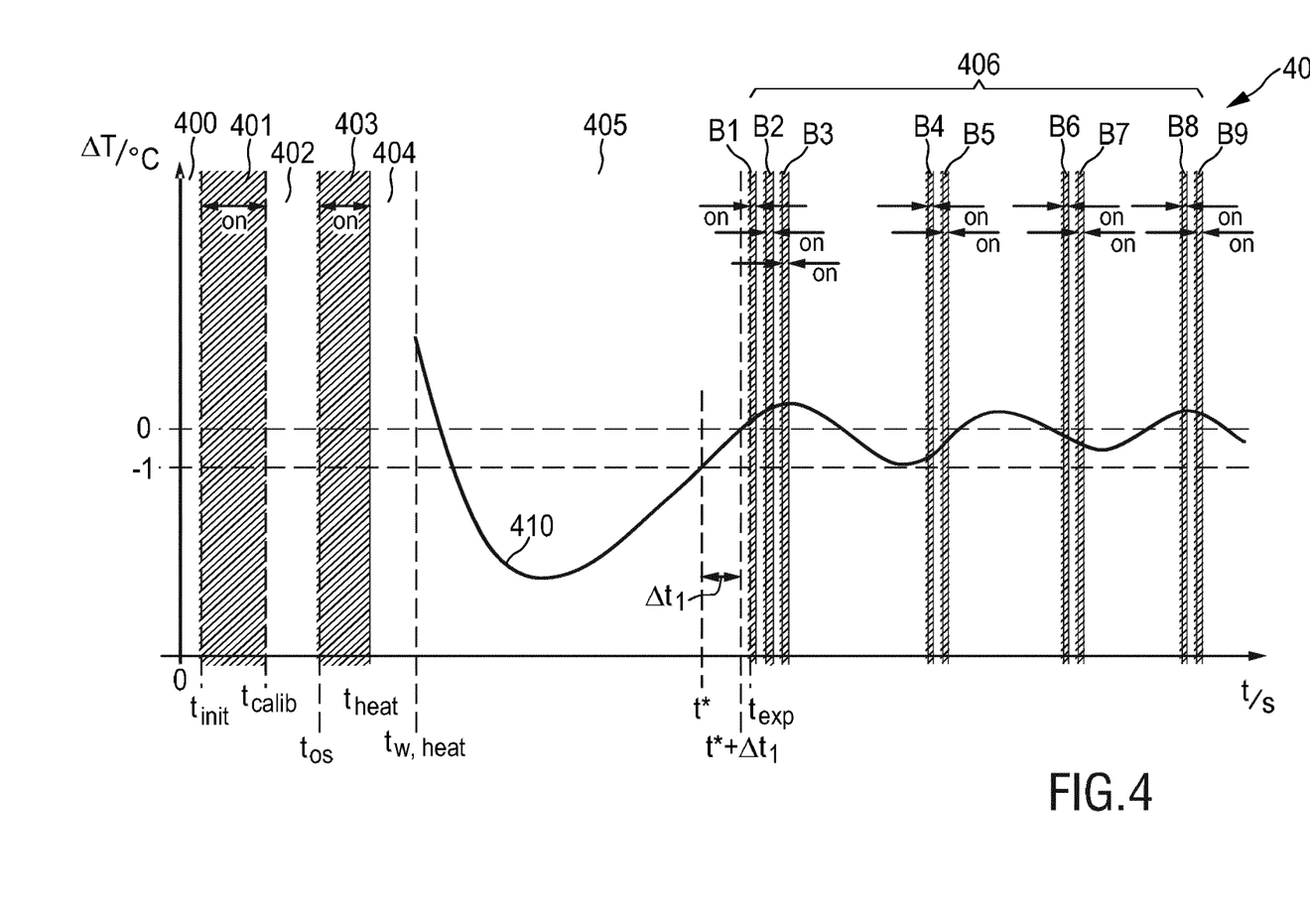
FIG. 4 shows a diagram of another temperature profile over time according to the present invention.

FIG. 4 shows a diagram of a temperature profile 40, representing the temperature T (in degree Celsius [° C.]) over time t (in seconds [s]), as obtained and used according to the present invention. Similar to the heating procedure shown in FIG. 3, the heating procedure shown in FIG. 4 also includes different heating and/or cooling phases, in particular an initial phase 400, a calibration heating phase 401, a first overshoot phase 402, a second heating phase 403, a second overshoot phase 404, a cooling phase 405 and a thermostat heating phase 406. The diagram in FIG. 4 shows one curve 410, which represents the temperature difference of the fluid 18, $\Delta T_w(t)$ calculated over time according to equation (1).

In particular, $\Delta t_0$ in equation (1) is chosen as $\Delta t_0=60$ [s] applies. At the beginning of the cooling phase 405, $\Delta T_w(t)$ is positive and decreases rapidly to negative values, as can be seen in FIG. 4. In addition, the absolute value of $\Delta T_w(t)$ first increases and than decreases. After the absolute value for $\Delta T_w(t)$ has passed its maximum during the cooling phase 405, an intermediate time point t* is registered at which the absolute value of the determined temperature difference $|\Delta T_w(t^*)| \leq 1°$ C. is fulfilled.

After the intermediate time point t*, the estimation unit 26 is configured to receive information about the state of the heating unit 20, i.e. whether the heating unit 20 is in an activated state or a deactivated state (step 607 of FIG. 6). At t=t*, the heating unit 20 is deactivated. If the heating unit 20 remains in the deactivated state over a first predefined time period of length $\Delta t_1$, preferably one minute ($\Delta t_1=60$ [s]), the estimation unit 26 estimates the arrival time point of the pre-set temperature for the food 12 to be the end time point $t_{arr,est}=t^*+\Delta t_1$ of the first predefined time period from t=t* to t=t*+$\Delta t_1$ (step 610 of FIG. 6). This is the case as shown in FIG. 4 which means that no thermostat heating occurs within the first predefined time period, in particular within the one minute after the intermediate time point t*, so that no heating energy is further provided for heating up the food 12 within the one minute.

Preferably, an indicator unit (not shown) can be provided for generating one or more audial and/or visual indicator signals upon estimation of the arrival time point. For instance, the visual text "milk ready" can be shown on a display. Alternatively, one or more beep tones may be generated so that the user is informed when the arrival time point is reached or is about to be reached.

The heating procedure shown in FIG. 4 corresponds to the case where relatively small amount of heating energy is needed to heat up a relatively small amount of food, in particular milk, starting from a relatively high initial milk temperature. In this case, the milk can reach the pre-set temperature during the cooling phase 405 before any thermostat boost.

If within the first predefined time period, in particular the one minute, thermostat heating is detected in step 607 of FIG. 6, further analysis is needed for estimating the arrival time point. This is explained hereinafter under reference of FIG. 5.

Figure 5:
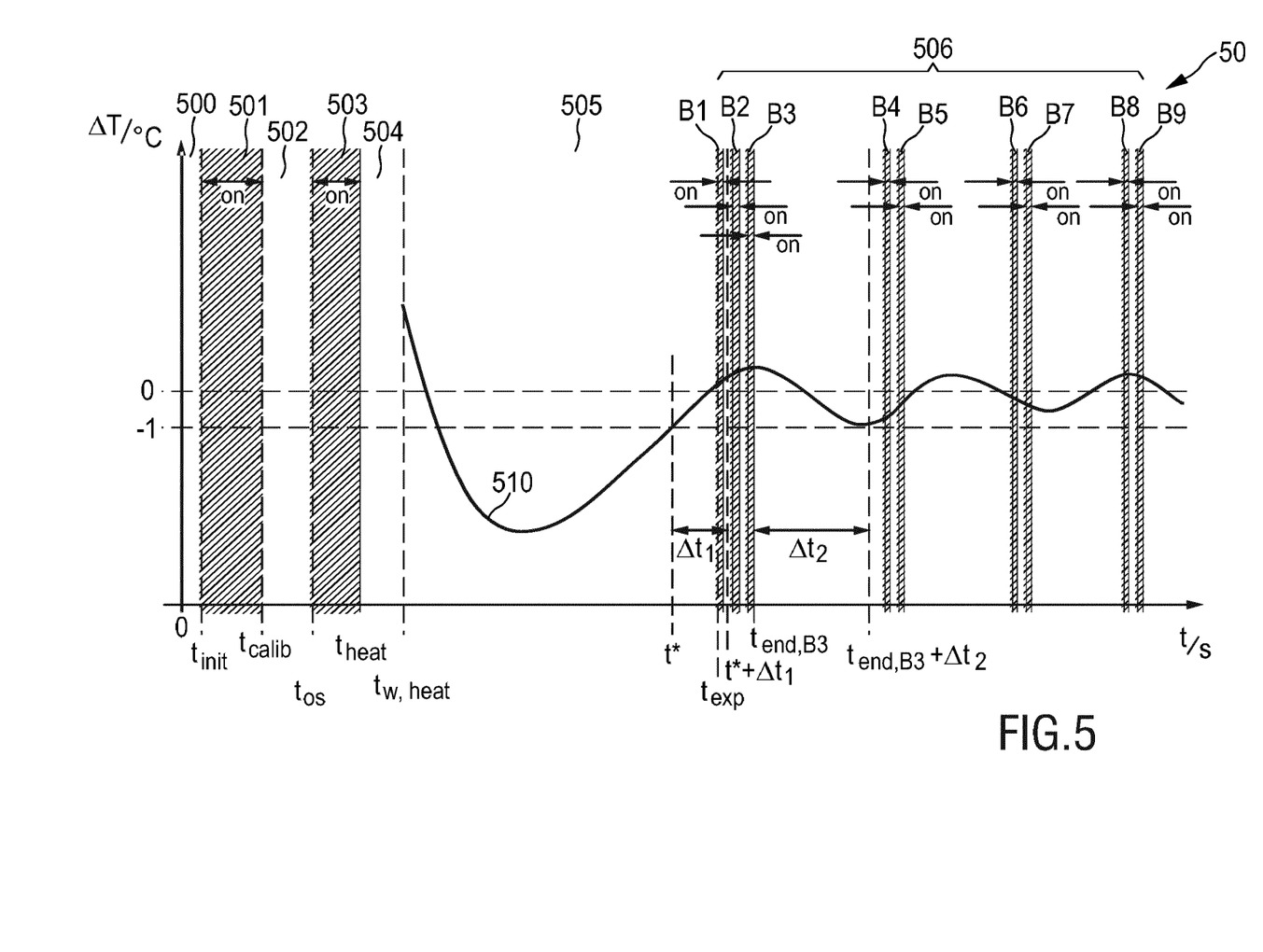
FIG. 5 shows a diagram of still a further temperature profile over time according to the present invention.

FIG. 5 shows a similar diagram to FIG. 4, except that during the first predefined time period $\Delta t_1$, which is preferably one minute, the heating unit 20 is detected to be in an activated state. This means that the thermostat heating phase 506 has began within the first predefined time period between t=t* and t=t*+$\Delta t_1$. In this case, the ETA function will allow more time to heat up the food and monitor the time duration between two successive heating periods, in particular two successive thermostat heating periods. Preferably, estimation unit 26 is configured to register the time duration between two subsequent thermostat heating periods, in particular heating boosts, from the beginning of the thermostat heating phase 506 (step 608 in FIG. 6) until a duration equal to or longer than a second predefined time period is detected. This is done by receiving information about the state of the heating unit 20 over time.

As exemplarily shown in FIG. 5, the estimation unit 26 is configured to determine whether the heating unit 20 is deactivated over the second predefined time period of length $\Delta t_2$, which is preferably three minutes, i.e. $\Delta t_2=180$ [s] (step 609 in FIG. 6). If this is not the case, the time registration in step 608 will be repeated starting from the end of the previous thermostat heating periods. As shown in FIG. 5, the time interval between the third heating boost B3 and the fourth heating boost B4 is longer than $\Delta t_2$. The arrival time point is therefore estimated to be $t_{arr,est}=t_{end,B3}+\Delta t_2$ (step 610 of FIG. 6), i.e. the end time point of the second predefined time period as shown in FIG. 5. In this case, no further heating energy is provided to heat up the food during the relatively long second predefined time period, meaning that the thermostat heating is mainly for compensating the heat energy loss of the food 12 over time, e.g. due to heat exchange with the surrounding such as the atmosphere.

The heating procedure shown in FIG. 5 corresponds to the case where large amount of energy is needed to heat up a relatively large amount of food, in particular milk, starting at a relatively low initial milk temperature. For these cases, the milk temperature can be lower than the pre-set temperature by 3° C. to 5° C. after the second heating phase 503. Therefore, more heating energy from the thermostat heating is needed to further heating up the milk after the second heating phase 503.

Preferably, an indicator unit may generate one or more audio and/or visual indicator signals at or prior to $t=t_{end,B3}+\Delta t_2$, in order to inform the user about the estimated arrival time point of the pre-set temperature for the food 12.

Figure 7:
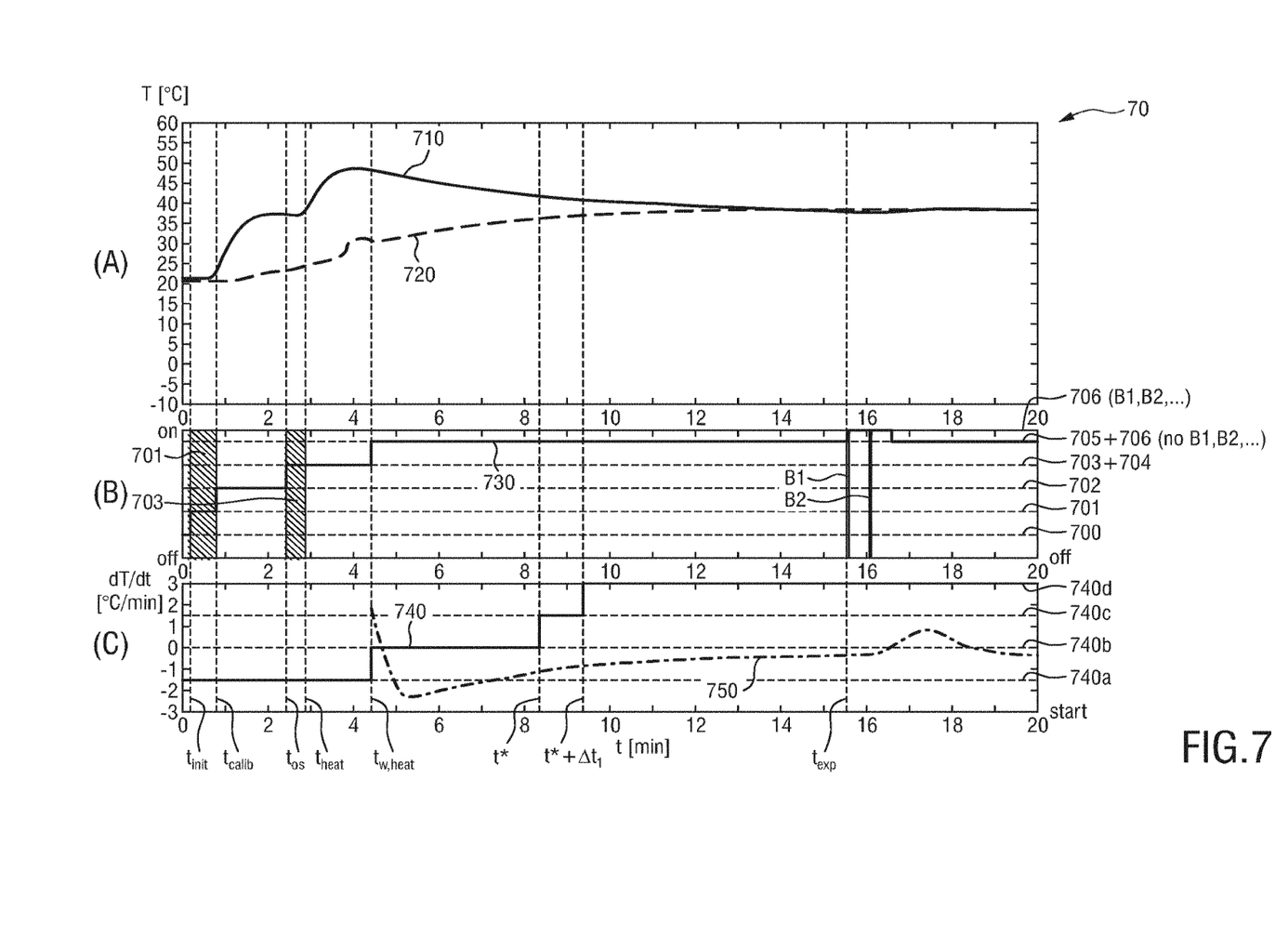
FIG. 7 shows a diagram of an experimentally obtained temperature profile, a diagram of the corresponding phases of the heating device and a diagram of a gradient of fluid temperature and estimated arrival time.

FIG. 7 shows a diagram of an experimentally obtained temperature profile (FIG. 7A), a diagram of the corresponding phases of the heating device 10, 10' (FIG. 7B) and a diagram of the gradients of the fluid temperature and estimated arrival time (FIG. 7C). The temperature profile in FIG. 7A is similar to that shown in FIG. 4. Two curves are shown in FIG. 7A, the first curve 710 representing the fluid temperature and the second curve 720 representing the estimate food temperature. The time points characterizing the different phases of the heating device 10, 10' are indicated by the vertical dashed lines. In FIG. 7B, different phases of the heating device 10, 10' are shown by the curve 730, which goes through different levels 700-706 indicating the different phases—an initial phase 700, a calibration heating phase 701, a first overshoot phase 702, a second heating phase 703, a second overshoot phase 704, a cooling phase 705 and a thermostat heating phase 706—of the heating device 10, 10'.

In FIG. 7C, the gradient of the fluid temperature (as water temperature) is shown by the curve 750 starting from the start time point $t_{w,heat}$ of the cooling phase 705. The curve 740 represents the status of the pre-set temperature. The curve 740 shows different levels 740a-d, including initialization (740a, from t=0 to t=development (740b, $t_{w,heat}$), from t=$t_{w,heat}$ to t=t*), approaching (740c, from t=t* to t=t*+$\Delta t_1$) and arrival (740d, at t=t*+$\Delta_1$). It is noted that water is used as fluid and milk is used as food for obtaining the result of FIG. 7. The volume of the milk and/or water is 60 ml, wherein the pre-set milk temperature is 37° C. The length of the first predefined time period is chosen to be $\Delta t_1$=1 min. It can also be seen from FIG. 7 that the pre-set milk temperature has been reached at $t_{arr,est}$=t*+$\Delta t_1$ before the start of the thermostat heating phase 706, marked by t=$t_{exp}$.

Figure 8:
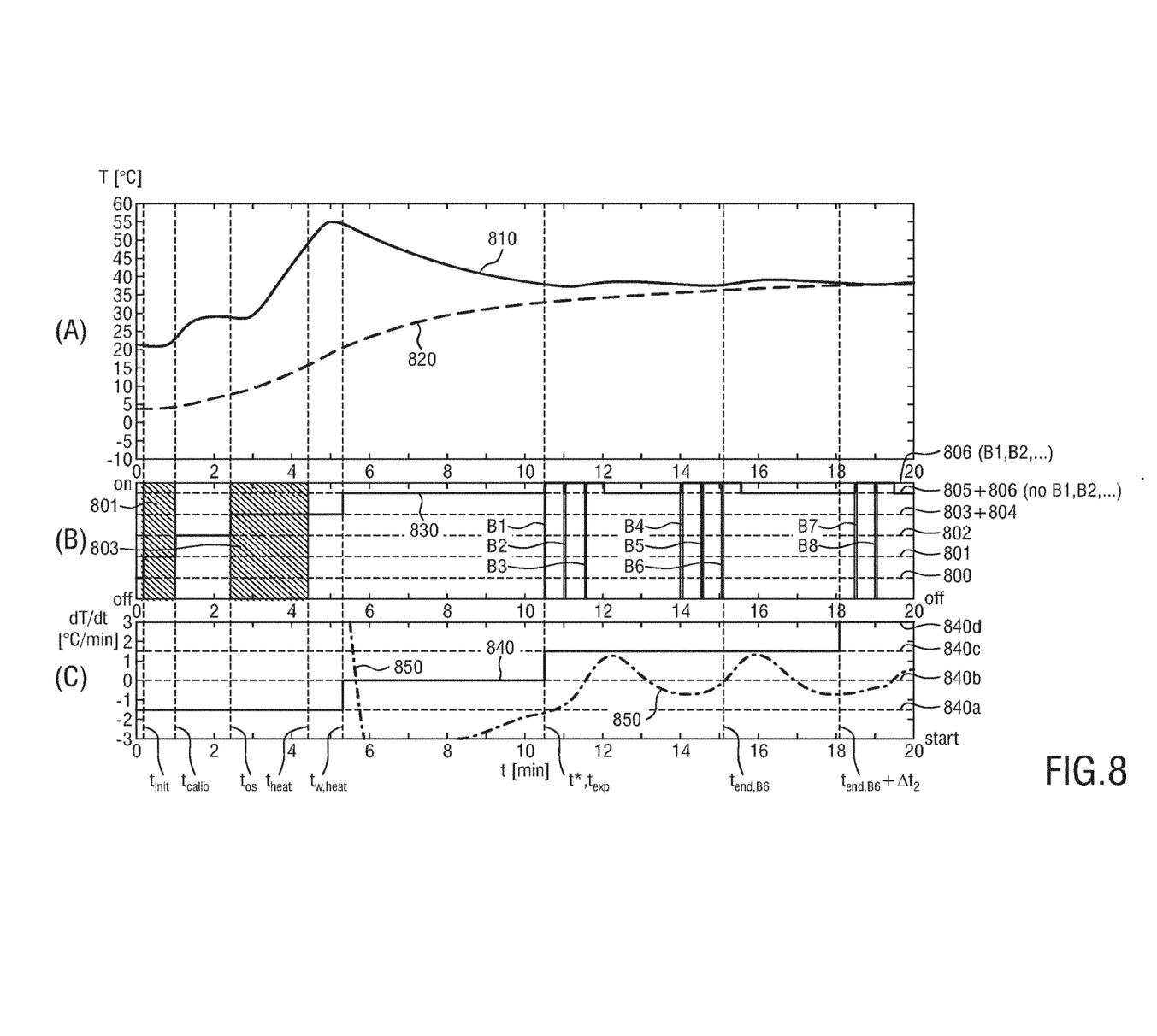
FIG. 8 shows another diagram of an experimentally obtained temperature profile, a diagram of the corresponding phases of the heating device and a diagram of a gradient of fluid temperature and estimated arrival time.

FIG. 8 shows a diagram of an experimentally obtained temperature profile, FIG. 8A a diagram of the corresponding phases of the heating device 10, 10' (FIG. 8B) and a diagram of the gradients of the fluid temperature and estimated arrival time (FIG. 8C). The temperature profile in FIG. 8A is similar to that shown in FIG. 5. Two curves are shown in FIG. 8A, the first curve 810 representing the fluid temperature and the second curve 820 representing the estimate food temperature. The time points characterizing the different phases of the heating device 10, 10' are indicated by the vertical dashed lines. In FIG. 8B, different phases of the heating device 10, 10' are shown by the curve 830, which goes through different levels 800-806 (similar to FIG. 7B) indicating the different phases of the heating device 10, 10'.

In FIG. 8C, the gradient of the fluid temperature (as water temperature) is shown by the curve 850 starting from the start time point $t_{w,heat}$ of the cooling phase 805. The curve 840 represents the status of the pre-set temperature. The curve 840 shows different levels 840a-d, including initialization (840a, from t=0 to t=development (840b, $t_{w,heat}$), from t=$t_{w,heat}$ to t=t*), approaching (840c, from t=t* to t=t*+$\Delta_1$) and arrival (840d, at t=t*+$\Delta_1$). It is noted that water is used as fluid and milk is used as food for obtaining the result of FIG. 8. The volume of the milk is 210 ml while the volume of water is 180 ml, wherein the pre-set milk temperature is 37° C. The length of the first predefined time period is chosen to be $\Delta t_1$=1 min. In difference to FIG. 7, the pre-set milk temperature is not reached before the start of the thermostat heating phase 806, marked by t=$t_{exp}$. As exemplarily shown in FIG. 8B, the intermediate time point essentially coincides with the start of thermostat heating phase, i.e. t*=$t_{exp}$. The time interval between two subsequent heating periods is determined starting at t=$t_{exp}$. As shown in FIG. 8B-C, the time interval between the heating boost B6 and the heating boost B7 is longer than the second predefined time period of 3 minutes. Therefore, the arrival time point is estimated to be reached at the end of the second predefined time period, i.e. $t_{arr,est}$=$t_{end,B6}$+$\Delta t_2$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A heating device for heating food in a container and for estimating an arrival time of a pre-set food temperature, comprising:
    a chamber configured to contain a fluid and to receive the container;
    a heating unit for heating the fluid in the chamber;
    a temperature measuring element for measuring a temperature of the fluid over a time range;
    a calculation unit for determining, for each monitored time point of a number of monitored time points in the time range, a temperature difference of the fluid between a first time point of the time range and a second time point of the time range different from the first time point, wherein the second time point comprises a time point that occurs earlier than the first time point by a given amount of time, the calculation unit further being configured to compare the determined temperature difference to a predefined temperature difference, wherein the calculation unit is configured to compare the determined temperature difference in a time period in which the heating unit is in a deactivated state; and
    an estimation unit for estimating an arrival time point, at which a pre-set temperature for the food contained in the container is reached, based on a comparison result of the calculation unit.

2. The heating device according to claim 1, wherein the calculation unit is configured to register an intermediate time point being the later one from the first and the second time point when at the first time point the calculated temperature difference or its absolute value is less than or equal to the predefined temperature difference.

3. The heating device according to claim 2, wherein the intermediate time point is registered after an absolute value of the determined temperature difference has reached a maximum.

4. The heating device according to claim 2, wherein the estimation unit is configured to estimate the arrival time point being a first end time point at the end of a first predefined time period starting at the intermediate time point, if the heating unit is in a deactivated state at the intermediate time point and remains in the deactivated state over the first predefined time period.

5. The heating device according to claim 2, wherein the estimation unit is configured to estimate the arrival time point based on detection of an activated state of the heating unit within a first predefined time period starting at the intermediate time point.

6. The heating device according to claim 5, wherein the estimation unit is configured to estimate the arrival time point based on detection of a heating period of the heating unit ending at a second end time point, the second end time point being temporally later than the detection of the activated state of the heating unit.

7. The heating device according to claim 6, wherein the estimation unit is configured to estimate the arrival time point based on detection of a state of the heating unit over a second predefined time period starting at the second end time point.

8. The heating device according to claim 7, wherein the estimation unit is configured to estimate the arrival time point being a third end time point at the end of the second predefined time period if the heating unit is in a deactivated state over the second predefined time period.

9. The heating device according to claim 1, wherein the given amount of time between the first time point and the second time point is less than 5 minutes.

10. The heating device according to claim 1, wherein the predefined temperature difference is non-negative and less than 5° C.

11. The heating device according to claim 1, wherein the temperature measuring element is in direct contact with the fluid in the chamber.

12. The heating device according to claim 1, further comprising an indicator unit for generating one or more audio and/or visual indicator signals upon estimation of the arrival time point.

13. The heating device according to claim 1, wherein the given amount of time between the first time point and the second time point is less than or equal to 1 minute.

14. The heating device according to claim 1, wherein the predefined temperature difference is non-negative and less than or equal to 1° C.

15. A heating device for heating food in a container and for estimating an arrival time of a pre-set food temperature, comprising:
   a chamber configured to contain a fluid and to receive the container;
   a heating unit for heating the fluid in the chamber;
   a temperature measuring element for measuring a temperature of the fluid over a time range;
   a calculation unit for determining, for each monitored time point of a number of time points in the time range, a temperature difference of the fluid between a first time point of the time range and a second time point of the time range different from the first time point, wherein the second time point comprises a time point that occurs earlier than the first time point by a given amount of time, the calculation unit further being configured to compare the determined temperature difference to a predefined temperature difference, wherein the calculation unit is configured to compare the determined temperature difference in a time period in which the heating unit is in a deactivated state; and
   an estimation unit for estimating an arrival time point, at which a pre-set temperature for the food contained in the container is reached, based on a comparison result of the calculation unit,
   wherein the given amount of time between the first time point and the second time point is less than 5 minutes, and
   wherein the calculation unit is configured to register an intermediate time point being the later one from the first and the second time point when at the first time point the calculated temperature difference or its absolute value is less than or equal to the predefined temperature difference.

16. The heating device according to claim 15, wherein the intermediate time point is registered after an absolute value of the determined temperature difference has reached a maximum.

17. The heating device according to claim 15, wherein the estimation unit is configured to estimate the arrival time point being a first end time point at the end of a first predefined time period starting at the intermediate time point, if the heating unit is in a deactivated state at the intermediate time point and remains in the deactivated state over the first predefined time period.

18. The heating device according to claim 15, wherein the estimation unit is configured to estimate the arrival time point based on detection of an activated state of the heating unit within a first predefined time period starting at the intermediate time point.

* * * * *